United States Patent
Boger et al.

(10) Patent No.: US 10,887,918 B2
(45) Date of Patent: Jan. 5, 2021

(54) ENHANCED WI-FI ACCESS PROTOCOL (EWAP)

(71) Applicant: Apple Inc., Cupertino, CA (US)

(72) Inventors: Yoel Boger, Shoham (IL); Yaniv Dvory, Kfar Saba (IL); Hay Lev, Modiin (IL); Koby Vainapel, Herzliya (IL)

(73) Assignee: Apple Inc., Cupertino, CA (US)

( * ) Notice: Subject to any disclaimer, the term of this patent is extended or adjusted under 35 U.S.C. 154(b) by 279 days.

(21) Appl. No.: 15/962,860

(22) Filed: Apr. 25, 2018

(65) Prior Publication Data

US 2019/0098668 A1 Mar. 28, 2019

Related U.S. Application Data

(60) Provisional application No. 62/562,884, filed on Sep. 25, 2017.

(51) Int. Cl.
| | |
|---|---|
| *H04W 74/08* | (2009.01) |
| *G06F 7/58* | (2006.01) |
| *H04W 84/12* | (2009.01) |

(52) U.S. Cl.
CPC .......... *H04W 74/0833* (2013.01); *G06F 7/58* (2013.01); *H04W 84/12* (2013.01)

(58) Field of Classification Search
CPC ........... H04W 74/0833; H04W 74/008; H04W 74/08; H04W 74/002; H04W 74/0808; H04W 74/0841; H04W 84/12; H04W 84/18; H04W 72/0406; H04W 56/00; H04W 4/70; H04W 88/02; G06F 7/58; H04L 47/10

See application file for complete search history.

(56) References Cited

U.S. PATENT DOCUMENTS

| | | | |
|---|---|---|---|
| 6,781,956 B1 * | 8/2004 | Cheung | H04L 47/10 370/235.1 |
| 8,670,395 B2 | 3/2014 | Singh et al. | |
| 2013/0016602 A1 * | 1/2013 | Diachina | H04W 72/048 370/216 |
| 2013/0070627 A1 | 3/2013 | Chen et al. | |
| 2014/0226588 A1 | 8/2014 | Benveniste | |
| 2015/0208444 A1 * | 7/2015 | Park | H04W 74/0808 370/329 |
| 2016/0212764 A1 * | 7/2016 | Yin | H04W 74/002 |

* cited by examiner

*Primary Examiner* — Ricardo H Castaneyra
(74) *Attorney, Agent, or Firm* — Kowert, Hood, Munyon, Rankin & Goetzel, P.C.

(57) ABSTRACT

This disclosure relates to wireless communication techniques. According to some embodiments, a wireless device may select a random number and sequentially advertise the bits of the random number. If the wireless device advertises the highest random number, it may proceed to transmit a packet using a channel. If another device advertises a higher number, the wireless device may not transmit its packet and may restart the process.

20 Claims, 7 Drawing Sheets

| 20 dev. | EWAP N=6 b | EDCA CW=15 | EDCA CW=31 | EDCA CW=63 | EDCA CW=127 | EDCA CW=255 | EDCA CW=511 | EDCA CW=1023 |
|---|---|---|---|---|---|---|---|---|
| Packet Latency (msec) | 8 | 10 | 8 | 8 | 8 | 8 | 9 | 11 |
| Collision Ratio | 3% | 45% | 38% | 29% | 20% | 12% | 6% | 3% |
| Net TP (Mbps) | 28.6 | 23.7 | 25.5 | 26.8 | 27.5 | 26.8 | 24.3 | 20 |

FIG. 13

| 10 dev. | EWAP N=6 b | EDCA CW=15 | EDCA CW=31 | EDCA CW=63 | EDCA CW=127 | EDCA CW=255 | EDCA CW=511 | EDCA CW=1023 |
|---|---|---|---|---|---|---|---|---|
| Packet Latency (msec) | 4 | 4.5 | 4 | 3.5 | 4 | 4.5 | 5.5 | 7.5 |
| Collision Ratio | 1% | 36% | 28% | 18% | 11% | 6% | 3% | 1% |
| Net TP (Mbps) | 28.6 | 25.6 | 27.1 | 27.7 | 27 | 24.3 | 19.9 | 14.5 |

FIG. 14

ENHANCED WI-FI ACCESS PROTOCOL
(EWAP)

PRIORITY CLAIM

This application claims priority to U.S. provisional patent application Ser. No. 62/562,884 entitled "Enhanced Wi-Fi Access Protocol (EWAP)," filed Sep. 25, 2017, which is hereby incorporated by reference in its entirety as though fully and completely set forth herein.

FIELD

The present disclosure relates to wireless communication, including techniques for access protocols in IEEE 802.11 wireless systems.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.
Wireless local area networks (WLANs) such as Wi-Fi, may involve contention-based distributed access systems. In particular, they may utilize unlicensed frequency bands or spectra, which are unpredictable and are often subject to interference. For example, Wi-Fi access may be based on carrier sense multiple access (CSMA) with a collision avoidance technique, such as single-user transmission via enhanced distributed channel access (EDCA). EDCA may involve random access to the shared communication channel or medium by contending electronic devices (which are sometimes referred to as 'stations' or STAs). As a result, Wi-Fi access may be negatively impacted by collisions among multiple devices requesting access. For example, if multiple devices attempt random access concurrently, both devices may restart the contention process, resulting in a delay for each of the devices and inefficient use of the shared channel. Hence, improvements in the field may be desirable.

SUMMARY

The present application relates, inter alia, to methods for Enhanced Wi-Fi Access Protocol (EWAP) operation for wireless devices in IEEE 802.11 (Wi-Fi) wireless communication systems, and describes apparatuses and wireless devices configured to implement the described methods.

In some implementations, according to the techniques described herein, a wireless device may select a random number and sequentially advertise (e.g., broadcast or transmit) the bits of the random number. The sequential transmission process may allow the wireless device to compare its random number to the random numbers of any other wireless devices contending for access to the wireless network. If the wireless device advertises, e.g., the highest random number, it may proceed to transmit a packet using a channel. If another device advertises a higher number, the wireless device may determine not to transmit its packet and may restart the process. This process may allow a wireless device advertising, e.g., a highest random number, to access the wireless medium. However, this mechanism can be modified to implement other rules. Embodiments of the invention may operate to provide wireless devices more efficient access to a shared medium, while maintaining fairness and interoperability with legacy devices.

The techniques described herein may be implemented in and/or used with a number of different types of devices, including but not limited to access point devices, cellular phones, portable media players, portable gaming devices, tablet computers, wearable computing devices, remote controls, wireless speakers, set top box devices, television systems, and other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description is considered in conjunction with the following drawings, in which:

FIGS. 13 and 14 illustrate example comparative results of EWAP and EDCA according to some embodiments.

Figure 1:
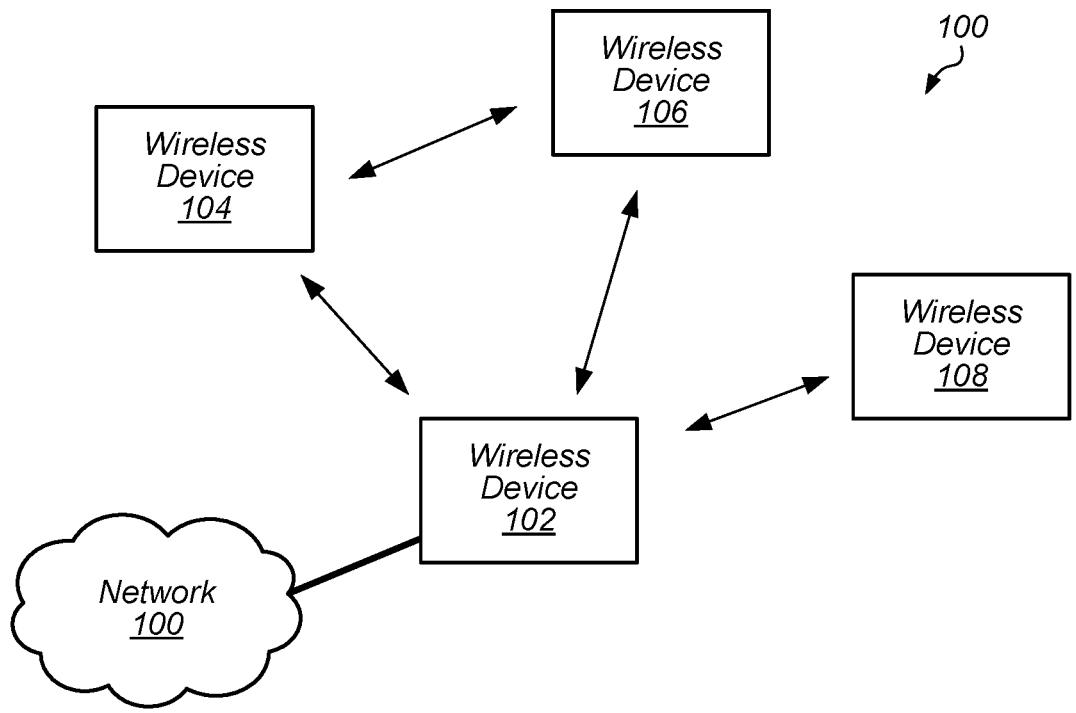
FIGS. 1-2 illustrate exemplary (and simplified) wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems devices which are mobile or portable and which performs wireless communications. Examples of STAs include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "STA" can be broadly defined to encompass any electronic, computing, and/or telecommunications device (or combination of devices) which is easily transported by a user and capable of wireless communication.

Base Station or Access Point (AP)—The terms "Base Station" and "Access Point" have the full breadth of their ordinary meaning, and at least include a wireless communication station installed at a fixed location and used to communicate as part of a wireless telephone system and/or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, 802.11ax and/or other IEEE 802.11 standards. IEEE 802.11 technology may also be referred to as "Wi-Fi" or "wireless local area network (WLAN)" technology.

Figure 2:
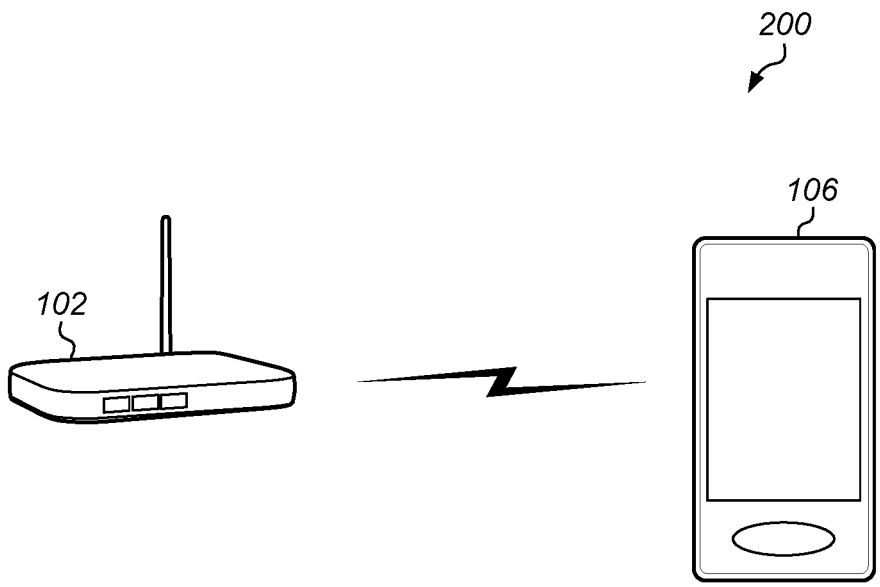

FIGS. 1-2—Communication System

FIG. 1 illustrates an exemplary (and simplified) wireless communication system 100, according to some embodiments. It is noted that the system 100 of FIG. 1 is merely one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or lesser numbers (e.g., any arbitrary number) of wireless devices.

As shown, the exemplary wireless communication system 100 includes multiple wireless devices 102-108 that communicate over a transmission medium. Some or all of the wireless devices may be substantially mobile devices ("stations" or "STAs"). Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network, or a mixture of infrastructure and ad-hoc networks. Note that it may be possible that the wireless network may include one or more 'hidden nodes'; for example, as shown, wireless device 108 may be within communication range of wireless device 102, but may not be able to detect (and/or be detected by) wireless devices 104 and 106. The wireless devices 102-108 may be configured to perform IEEE 802.11 wireless communication according to aspects of the present disclosure.

One or more of the wireless devices may be equipped to communicate with one or more external networks. For example, as shown, wireless device 102 may be communicatively coupled to network 100. The external network(s) may be any of a variety of types of networks, such as a cellular service provider's core network, the Internet, or an organization's intranet, among various possibilities.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi) and/or peer-to-peer wireless communication protocol (e.g., BT, Wi-Fi peer-to-peer, etc.) and at least one cellular communication protocol (e.g., GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), etc.). Any or all of wireless devices 102-108 may also, or alternatively, be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Any or all of wireless devices 102-108 may be configured to perform any of the method embodiments described herein, or any portion of any of the method embodiments described herein, for example to select an operational mode and/or operational characteristics depending on traffic conditions in the wireless communication system 100.

FIG. 2 illustrates an exemplary wireless communication system 200 in which aspects of the system 100 of FIG. 1 according to one possible implementation are represented. As shown in the illustrated system, wireless device 106 may be a mobile station (STA) 106 and wireless device 102 may be an access point 102 (also referred to as an "AP", or alternatively as a "base station" or "BS"). The STA 106 may be a user device with Wi-Fi communication capability, such as a mobile phone, a hand-held device, a computer or a tablet, or any suitable type of wireless device. The AP 102 may be an access point device with Wi-Fi communication capability, such as a wireless router or other wireless access point.

Either or both of the AP 102 and the STA 106 may include a processor that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
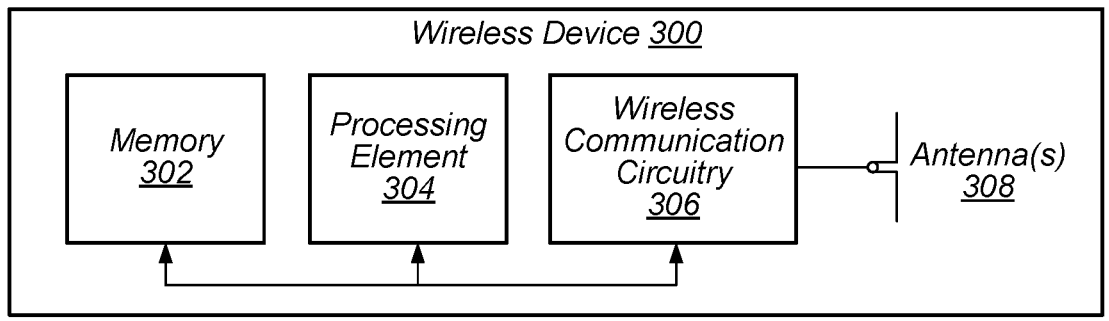
FIG. 3 illustrates a block diagram of an exemplary wireless device, according to some embodiments.

FIG. 3—Exemplary Block Diagram of a Wireless Device

FIG. 3 illustrates an exemplary block diagram of a wireless device 300, which may be configured for use in conjunction with various aspects of the present disclosure, according to some embodiments. The device 300 may be any of a variety of types of device and may be configured to perform any of a variety of types of functionality. For example, the device 300 may be a substantially portable device (e.g., a mobile device), such as a mobile phone, a personal productivity device, a computer or a tablet, a wearable device, a handheld gaming console, a portable media player, etc. Alternatively, the device 300 may be a substantially stationary device, such as a television, a subwoofer, speaker, or other audio rendering device, a wireless access point, a set-top box, etc., if desired.

As shown, the device 300 may include a processing element 304. The processing element 304 may include or be communicatively coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, and may alternatively be referred to as a 'radio'. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and/or transmit chains using the aforementioned hardware. For example, the wireless device 300 may share one or more parts of a receive and/or transmit chain between multiple wireless communication technologies (e.g., multiple communication interfaces), such as those discussed above. The wireless communication circuitry also may include or be coupled to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may provide processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (e.g., which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing features for operation in high density IEEE 802.11 wireless communication systems, such as those described herein with reference to, inter alia, FIGS. 4-14.

Figure 4:
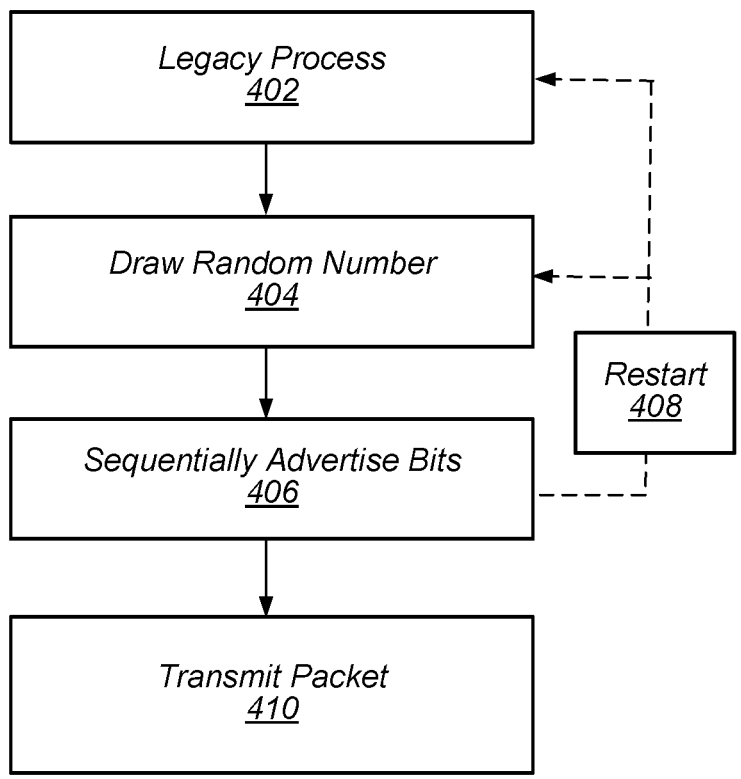
FIG. 4 is a flowchart diagram illustrating aspects of an exemplary method for implementing Enhanced Wi-Fi Access Protocol (EWAP), according to some embodiments.

FIG. 4—Flowchart Diagram

Under some conditions, multiple devices attempting to join (e.g., contending for resources of) a network may experience congestion and associated delays. If multiple devices attempt to transmit packets on the network concurrently, the packets may collide. As a result of such a collision, none of the devices may successfully utilize the network, and all of the devices may start the contention process again.

FIG. 4 is a flowchart diagram illustrating a method that may be used for performing wireless communication in a wireless communication system, such as an IEEE 802.11 wireless communication system, according to some embodiments. The method may be used to improve performance in the wireless communication system, in particular by providing a way for wireless devices to quickly and effectively contend for resources. In particular, the method may be a means to select a single device, e.g., of multiple contending devices, to transmit a packet on a channel of the system. The method may operate by randomly determining which one of multiple devices may transmit a packet following completion of the method. Other devices (e.g., all devices that may have contended, but were not selected) may restart the method to contend again. The method may iterate as needed, including as new devices begin to contend and as other devices cease contending (e.g., after transmitting a packet).

Among other implementations, various embodiments of this method may be used, for example, in an ad-hoc network with several devices (e.g., "new" devices) attempting to access the network without a pre-existing connection to the network. For example, embodiments of the method may allow for efficient determination of which device will transmit, and thus may reduce the delay associated with collision as described above. Additionally, in some embodiments, the method may be interoperable with legacy devices and networks (e.g., legacy devices may experience performance comparable to the performance of legacy methods), while also preserving fairness. For example, the opportunity to access a channel may be distributed equally among all devices, including those that are new to the network. Further, embodiments discussed herein may improve throughput and latency (e.g., in congested channels).

As a general (e.g., non-limiting) overview, the method may be implemented by a wireless device attempting to access (e.g., transmit on) a network. The method may include: performing a legacy process, generating a random number including N bits, sequentially advertising/transmitting each bit of the random number onto the wireless network over N successive time slots (e.g., in accordance with the process rules) in order to determine if the wireless device has the largest random number relative to other wireless devices contending for access to the wireless network (e.g., to compare the random number of the device to any other devices), halting the sequentially advertising/transmitting if the random number of the wireless device is smaller than that of another wireless device contending for access, and gaining access to the wireless network in response to determining that the random number generated by the wireless device is larger than the random numbers of the other wireless devices also contending for access to the wireless network.

Aspects of the method of FIG. 4 may be implemented by a wireless device, such as UE 106 or wireless device 300 illustrated in and described with respect to FIGS. 1-3, or more generally in conjunction with any of the computer systems or devices shown in the above Figures, among other devices, as desired. Note that while at least some elements of the method of FIG. 4 are described in a manner relating to the use of communication techniques and/or features associated with IEEE 802.11 specification documents, such description is not intended to be limiting to the disclosure, and aspects of the method of FIG. 4 may be used in any suitable wireless communication system, as desired. In various embodiments, some of the elements (or operations) of the methods shown may be performed concurrently, in a different order than shown, may be substituted for by other method elements, or may be omitted. Additional method elements may also be performed as desired. As shown, the method may operate as follows.

In 402, the wireless device may perform a legacy process (e.g., a legacy access process, such as specified in prior communication standard(s)) for contending for transmission resources (e.g., access to a communication medium). In some embodiments, the legacy process may be enhanced distributed channel access (EDCA) as defined in IEEE 802.11 specifications. For example, one or more wireless devices that are capable of operating as described herein may operate in conjunction with one or more legacy devices to access a shared medium, such as a Wi-Fi/802.11 network, where the term "legacy device" refers to a device that is not configured to include the techniques described herein. In other words, the wireless devices (e.g., legacy or non-legacy) may contend with each other for network access. The one or more wireless devices capable of operating as described herein and the one or more legacy devices may first perform a legacy process for accessing the shared medium (e.g., the Wi-Fi network). The legacy process may be a form of the traditional Carrier Sense Multiple Access (CSMA) and/or CSMA with collision avoidance (CSMA/CA) method used in existing Wi-Fi/IEEE 802.11 networks.

Executing the legacy process may result in collisions on the shared medium and/or detection of traffic on the shared medium, which may cause each of the various devices to "backoff" for a random amount of time before again attempting to communicate on the network. Thus, the legacy process may include the wireless device waiting for the duration of a backoff period, e.g., as in EDCA. In some instances, the wireless device may attempt to communicate on the network and detect no collisions, and hence be granted immediate access to the network according to the legacy process. In other words, a backoff period may not be used if no collision or traffic is detected. In other instances, when the wireless device attempts to communicate on the network and a collision and/or traffic is detected, the legacy process using a backoff period may be implemented.

During the legacy access process, the backoff period for each wireless device may be determined randomly (e.g., truly randomly or pseudo-randomly). The start of the backoff period may not occur until the medium (e.g., channel) has been idle for at least a predetermined period of time, e.g., a distributed coordination function (DCF) Interframe Space (DIFS) duration.

The backoff period may be determined according to various air access parameters. Such parameters may include the duration of a contention window (CW). For example, the backoff period may be a fraction of the CW. The backoff period may include multiple time slots (e.g., slots). Each slot may have a duration, e.g., 9 microseconds (e.g., 9 μs or 9 us or 9 usec). For example, the device may draw a random number N between 0 and CW. Thus, in one embodiment the duration of the backoff period may be N*9 μs.

Once the backoff period has begun, the device may decrement a timer (e.g., a CW timer or backoff timer) while the medium is idle. For example, during each slot in the backoff window, the value of the timer may be decreased by 1 (or other such value). If at any point while the timer is running, the channel is used by another device, the value of the timer may be reset to N. Following such a reset, the value of the timer may begin decrementing again when the channel is idle.

In some embodiments, the legacy process may not be used, e.g., in cases where no legacy devices are present or participating. For example, in scenarios in which all devices may be capable of operating according to the methods described herein, the legacy access process may not be used (and hence no backoff periods are used). In such cases, the legacy access process and its accompanying backoff periods may unnecessarily delay selection of a device for transmission, and thus the method may proceed directly to the improved access method described herein, without first attempting the legacy access process.

Following the expiration of the backoff period as part of the legacy process, the one or more devices that are capable of implementing the techniques described herein (e.g., the non-legacy devices or EWAP-capable devices) may begin the contention process described in operations 404—408. This contention process may be referred to as the EWAP protocol. Legacy wireless devices may not participate in the EWAP protocol contention process; instead, during the pendency of the EWAP process, the transmissions of the EWAP devices may be configured to cause legacy devices to remain silent, e.g., according to the legacy process. The EWAP protocol may be considered a "tie breaker process" or a "highest number contention operation". Each EWAP-capable wireless device may generate a random number having N bits (e.g., the number, expressed in binary may have a bit length of N bits) and then each wireless device may advertise or broadcast the values of its random number, according to the process, until one device (having the highest random number) gains access to the medium. Note that, although at least some of the embodiments of EWAP described herein are described in terms of high random numbers, embodiments with other decision rules, e.g., based on low random numbers, among other possibilities are contemplated. The EWAP protocol is described in greater detail below for an exemplary individual EWAP-capable device.

In 404, the device may generate a random (e.g., truly random or pseudo-random) number. The random number may have been previously determined with the random duration of the backoff period in 402, or may be determined separately e.g., at the beginning of the EWAP protocol. In some embodiments, a single random number of, e.g., 10 bits may be determined and the first bits (e.g., first 4 bits) may be used to determine the backoff period and the second bits (e.g., the remaining 6 bits) may be used for subsequent steps. Other embodiments can be implemented using other bit lengths for the first bits and/or the second bits. The random number(s) determined in this step may all have an equal number of bits, e.g., all contending devices may select random numbers with the same number of bits. In other words, the random number may be selected from a range between zero and some maximum value. In some embodiments, the maximum value may be a power of 2 minus 1 (e.g., in the case of a 6-bit random number: $(2^6)-1=63$). The number of bits can be configured as desired.

In 406, the device may sequentially (e.g., consecutively, e.g., beginning with the most significant bit) advertise the bits of the random number, by broadcasting/transmitting the bits onto the shared medium (the Wi-Fi network) in accordance with the rules (e.g., as described herein or as configured). The sequentially advertised bits may be advertised over the course of an advertisement window (AW), e.g., with one bit advertised in each slot. Thus, in the case that the random numbers have N bits, the duration of the AW may be N multiplied by the duration of a slot (e.g., N*9 μs). In some embodiments, more than one bit may be advertised during a slot. In some embodiments, the last bit may be the least significant bit, e.g., the bits may be advertised in order of decreasing significance.

Beginning with the first bit of the bits to be sequentially advertised, the device may determine whether to advertise (broadcast) the bit, e.g., based on whether the bit meets a condition. For example, if the value of the bit is equal to 1, the bit may be advertised (broadcast on the Wi-Fi network). To advertise a bit, the device may transmit the value of the bit on the Wi-Fi network during a slot. For example, if the value of the first bit is one, the wireless device transmits a 1 during the first slot of the AW. During a slot in which the device advertises a bit (e.g., transmits a 1), the device may ignore whether other devices are transmitting on the channel. Following the end of the slot, the device may proceed (e.g., advance or move) to the next bit. Thus, each device having a random number with a value of 1 for the present bit will transmit.

In the case that a bit does not meet the condition (e.g., in the case that the bit is equal to 0), then in some embodiments the wireless device may not transmit the bit. During the slot associated with such a bit, the device may monitor the channel to determine whether at least one other device advertises a bit (e.g., transmits a bit equal to 1); thus, the device may compare its random number to the random number(s) of any other devices contending for access. The device may also transmit during a portion or partition of the slot, e.g., in order to demonstrate to other devices (e.g., non-EWAP capable devices, also called legacy devices) that the channel is not clear (e.g., that CCA is set).

In the case (e.g., a first sub-case) where the wireless device has a 0 value for its bit (e.g., a current bit), and the wireless device determines that another device has transmitted a bit (e.g., has a value equal to 1 for the current bit of its number) during such a slot, the device may determine that its random number (e.g., sequence of bits) does not entitle the device to gain access to the medium (e.g., because its random number is not the highest). In this case, the device may discontinue the current EWAP contention process (e.g., may halt/stop sequentially transmitting any remaining bits) and begin anew to re-contend for permission to transmit on the network. Accordingly, the device may, at 408, restart the process of contending for access (e.g., may return to 402 or to 404, according to various embodiments). Random numbers may be redrawn at 402 or 404, or they may be reused (e.g., retained). According to some embodiments, such devices restarting the process may enter a passive or lower power state (e.g., depower some communication circuitry and/or sleep) for a period. In some implementations, the period may be equal to the remainder of the present AW.

In the case (e.g., a second sub-case) that no other device transmits a bit during such a slot, the device may proceed to advertise the next bit during the next time slot. In this second sub-case, each of the EWAP-capable devices has a 0 value in the current bit position of their respective random numbers, and thus since there is no "loser" in this instance (no device has a higher number than another), all devices in contention at the current bit/slot may advance (e.g., move) to the next bit/slot.

Following the sequential advertisement of all of the bits (e.g., after advertising the last, or least significant, bit of the random number), a device may determine that it is selected to transmit following the AW. Such a device may be the only device that has not restarted the process (e.g., via 408) due to another device transmitting a bit (e.g., a 1) during a slot in which the device was not transmitting (e.g., because its bit was 0 for that slot). Thus, in some embodiments, the device with the highest random number (e.g., higher than that of any other contending device) will be the device that is selected to gain access to the shared medium.

Accordingly, following the expiration of the AW, at 410, the device may transmit one or more packets to at least one other device on the network (e.g., and may thus gain access to the wireless medium). The packet(s) may include a MAC protocol data unit (MPDU) or aggregated MPDU (AMPDU). Such an MPDU may be encapsulated, e.g., in a PHY layer PDU (PPDU).

Note that there may be a non-zero probability that two (or more) devices have determined that they each are the selected device, and thus the transmissions of such devices may collide. The probability of such a collision may decline exponentially with the number of bits in the randomly generated numbers (e.g., duration of the AW).

Figure 5:
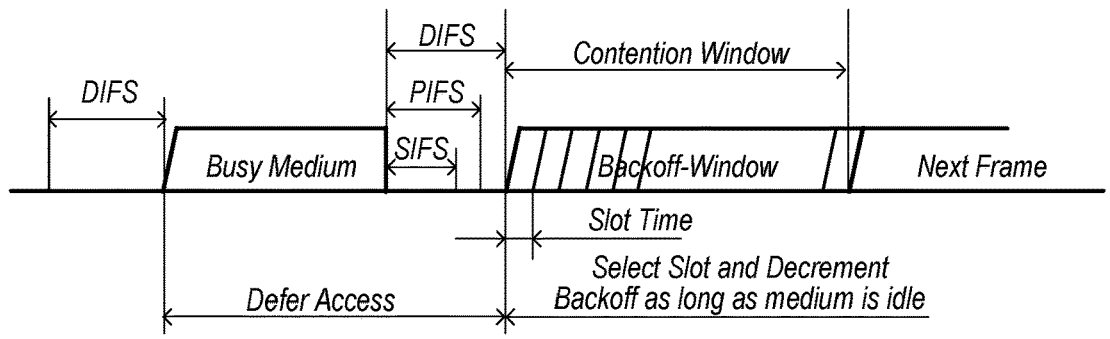
FIG. 5 is an example timing diagram illustrating aspects of Enhanced Distributed Channel Access (EDCA), according to some embodiments.

FIG. 5—Timing Diagram of Enhanced Distributed Channel Access (EDCA)

In some embodiments, EDCA may operate as shown in FIG. 5. A device contending to transmit on a WLAN may defer access while the medium (e.g., channel of the WLAN) is busy. A device may further defer access until the medium has been idle (e.g., free or unused) for an amount of time equal to at least a DIFS. The DIFS may be greater than a short interframe space (SIFS) or point coordination function (PCF) interframe space (PIFS). Following the DIFS, the device may wait a random number of slots (e.g., a backoff window) during a contention window (CW). If the medium is used by another device during the backoff window, the device may restart the backoff window after the medium has been idle for a DIFS. Following expiration of the backoff window, the device may attempt to transmit a packet. For example, as in the illustrated scenario, the backoff window may include five slots (e.g. based on the random number of the device). Thus, the device may begin transmitting in the sixth slot if no other device transmits during the first five slots.

Figure 6:
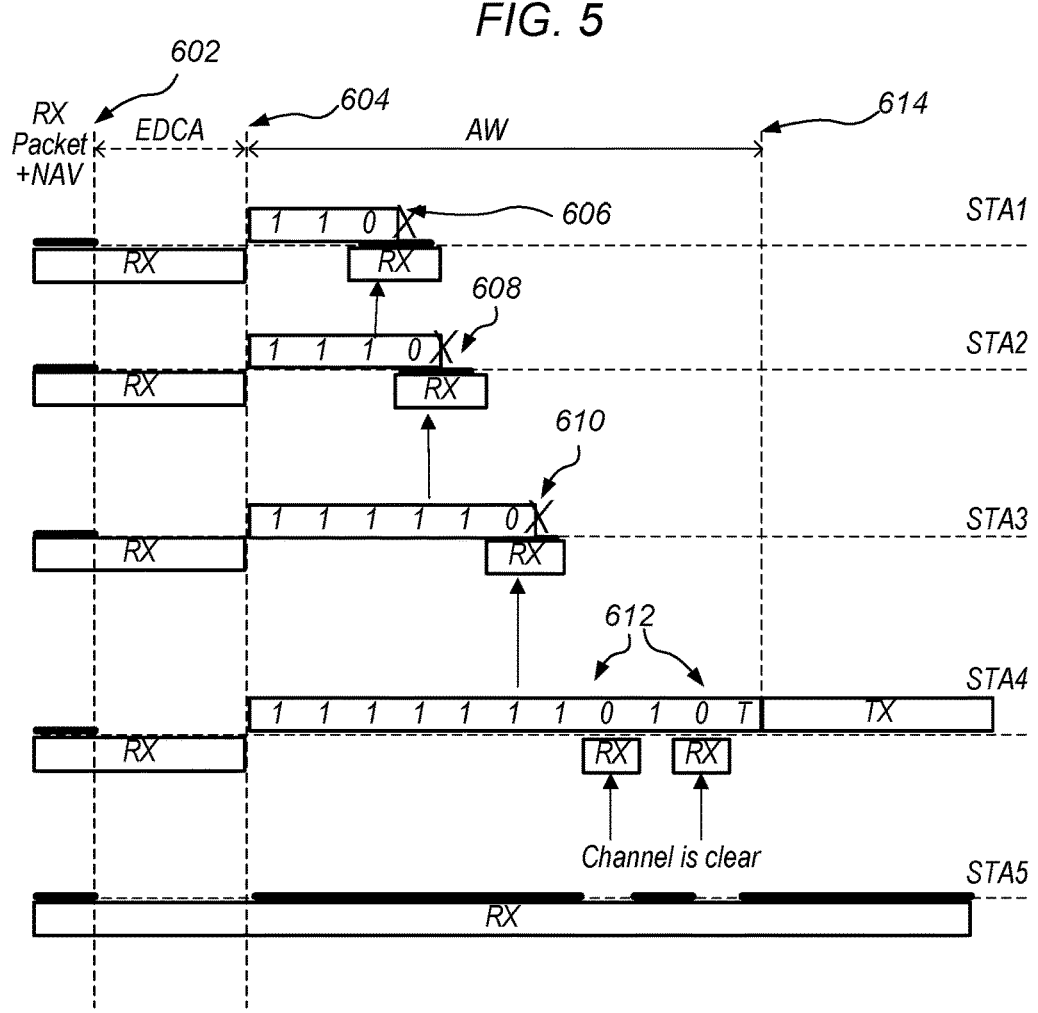
FIG. 6 illustrates an example of contention using EWAP, according to some embodiments.

FIG. 6—Timing Diagram of Multiple Devices Contending Using EWAP

FIG. 6 illustrates the contention between five devices (e.g., STA1-STA5) for transmission using an embodiment of the EWAP process. Four of the stations (e.g., STA1-STA4) may be devices capable of implementing EWAP, and the fifth (e.g., STA5) may be a legacy device not capable of implementing EWAP. As will be appreciated, the random elements (e.g., backoff period durations, random numbers, etc.) shown and described herein are illustrative examples, and other outcomes/values of these random elements are possible. Further, different numbers of contending devices (e.g., legacy and/or EWAP-capable devices) are possible.

Each of the STAs may receive a packet including a Network Allocation Vector (NAV). The NAV may represent a logical (e.g., virtual) clear channel assessment (CCA). Based on the duration field in the MAC header, the STAs may set their NAV (e.g., start a timer based on the duration) and refrain from accessing the medium during that duration of time, according to some embodiments. In other words, the duration field may signal the STAs that the channel will be busy for an amount of time (e.g., the duration), and may become available following the duration.

Following the expiration of the NAV at 602, the STAs may operate according to EDCA (e.g., as described above). In the illustrated example, each of the STA1-STA4 may complete the backoff window at the same time, e.g., at 604. In other words, the randomly determined length of the backoff period of STA1-STA4 may be equal, and the backoff period of STA5 may be greater than that of STA1-STA4. Note that if (e.g., in an alternative example, different from the illustrated example) the backoff period of any individual STA were less than all of the other STAs' backoff periods, that STA may be selected to transmit.

Beginning at 604, each of STA1-STA4 may sequentially advertise the bits of their random numbers, e.g., beginning with the first (e.g., most significant) bit. In the illustrated case, the first bit for each of STA1-STA4 may be one, and thus each of STA1-STA4 may transmit during the first slot. Thus, the backoff window of STA5 may be reset at 604 due to detecting the transmissions of the other devices beginning at that time, according to some embodiments. The second bit for each of STA1-STA4 may also be one, so they may also transmit during the second slot.

At 606, during the slot associated with the third bit, STA1 may not transmit (e.g., it may instead receive (e.g., RX) because its third bit is 0), and may detect that at least one other STA is transmitting a 1. Therefore, STA1 may determine that it is not selected to transmit at this time and may restart the contention process, according to some embodiments.

Similarly, at 608, during the slot associated with the fourth bit, STA2 may determine that it is not selected to transmit (e.g., because its fourth bit is 0, and at least one other STA is transmitting a 1), and may thus restart the process. Similarly, at 610, STA3 may determine that it is not selected and may restart, according to some embodiments.

At 612, STA 4 may not transmit its bits (e.g., because its $8^{th}$ and $10^{th}$ bits are zeroes), and may detect that no other STA is transmitting a 1 during these times. In other words, STA4 may monitor the channel and detect that the channel is clear (e.g., CCA is clear and transmission energy is not detected), according to some embodiments.

The advertising window (AW) may expire at 614. At this time, STA4 may determine that it is selected to transmit (e.g., because no other device transmitted a 1 during a slot in which it was receiving during the AW). Therefore, STA4 may prepare to transmit (e.g., pre-transmission functions) at the conclusion of the AW and then may begin to transmit a packet, according to some embodiments.

STA5 may not transmit at any point during the illustrated sequence because it may never detect that the medium has been idle for at least a DIFS after time 604, according to some embodiments. For example, other devices (e.g., STA1-STA3 as well as STA5) may also detect the clear channel at 612, but because the channel is only clear for one slot at a time (e.g., less than DIFS), such other devices may not begin to transmit.

Figure 7:
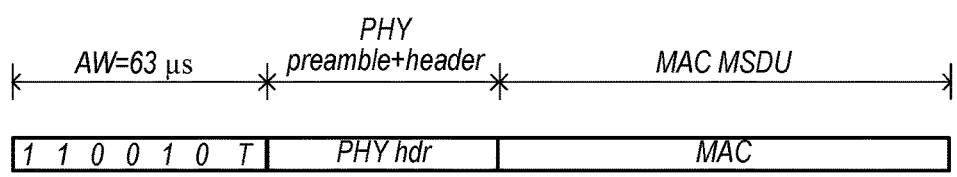
FIG. 7 illustrates an example EWAP packet format, according to some embodiments.

FIG. 7—EWAP Construction

FIG. 7 illustrates an exemplary construction of an EWAP communication, according to some embodiments.

As shown, the random sequence of bits for advertisement during the AW may include 6 bits. However, it is possible to use a random sequence with a greater or lesser number of bits. Note that the values of the bits shown are exemplary and that other values are possible. An additional slot, e.g., a seventh slot (e.g., "T"), may be included in the AW for pre-transmission functions (e.g., initiating the radio, preparing the remainder of the communication, etc.). According to some embodiments, during the pre-transmission slot, the device may perform transmissions so that other devices will not decrement their timers (e.g., and may reset their CW timers), will determine that the CCA is not clear, and will not transmit in the subsequent period. Such a transmission may avoid or reduce the likelihood of collisions for the remainder of the communication. Following the AW is the PHY preamble and header information, and then a service data unit (SDU). The SDU may be a physical layer SDU (PSDU) or a MAC layer SDU (MSDU), according to some embodiments. In some embodiments, following the AW, the remainder of the packet (e.g., frame or transmission) may be, e.g., an MPDU or AMPDU according to 802.11 standards.

FIGS. 8-11—EWAP Slot Partition Details

According to some embodiments, slots may be subdivided, e.g., into slot partitions or slot portions. FIGS. 8-11 illustrate exemplary partitioning.

Figure 8:
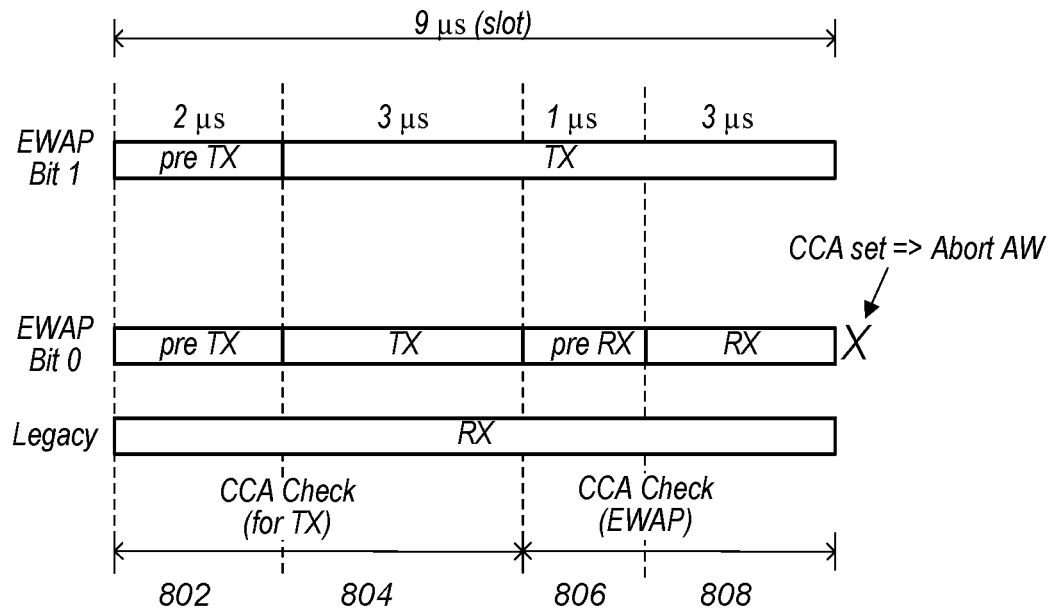
FIGS. 8-11 illustrate example slot partitions, according to some embodiments.

FIG. 8 illustrates the duration of a single slot (e.g., a 9 µs slot) divided into slot partitions, according to some embodiments. The slot is shown for three devices: an EWAP capable device with a bit equal to 1 (e.g., bit 1) for the slot, an EWAP capable device with a bit equal to 0 (e.g., bit 0) for the slot, and a legacy device (e.g., non-EWAP capable).

It will be noted that the times (e.g., durations) and arrangements of partitions shown in FIGS. 8-11 are exemplary only, and that the durations of the slots and slot partitions may be configured as desired. Further, the order of slot partitions may be changed, or some slot partitions may be skipped, or still other partitions may be added, according to some embodiments.

During the first 2 microseconds, 802, (e.g., µs, usec, or us), each of the EWAP devices may complete pre-transmission activities, according to some embodiments.

During the next 3 µs, 804, both of the EWAP devices may transmit. The purpose of these transmissions may be to convey to other devices (e.g., legacy devices) that the channel is not clear (e.g., the CCA is set). The devices may transmit any of a variety of signals during this time. In some embodiments, the EWAP device with bit 1 may transmit a 1.

The combination of time periods 802 and 804 may be considered a CCA check for transmission (TX). During this time, legacy devices may check CCA, and transmissions from EWAP devices (e.g., including those with bit 0) may cause them to determine that the CCA is not clear, and thus prevent them from transmitting, according to some embodiments.

During the next 1 µs, 806, the EWAP device with bit 0 may prepare to receive (e.g. pre RX), according to some embodiments. At the same time, the EWAP device with bit 1 may transmit the value of the bit (e.g., 1).

During the final 3 µs, 808, the EWAP device with bit 1 may continue to transmit the value of the bit (e.g., 1). At the same time, the EWAP device with bit 0 may receive. During this time, the EWAP device with bit 0 may detect the 1 transmitted by the EWAP device bit 1. Therefore, the EWAP device bit with 0 may determine that the CCA is set (e.g., is not clear) and may abort the Advertisement Window (AW). Accordingly, the EWAP device with bit 0 may restart the contention (e.g., EWAP) process.

During the entire 9 µs, the legacy device may receive and may not transmit on the channel. As the slot progresses (e.g., at 804, 806, and/or 808), the device may detect the transmissions from one or more of the EWAP devices and may determine that the CCA is not clear (e.g., is set). Accordingly, the legacy device may therefore reset its timer and may continue the EDCA process.

The combination of time periods 806 and 808 may be considered a CCA check for EWAP devices. In other words, EWAP devices with a bit 0 may receive and may detect transmission energy from one or more other devices (e.g., EWAP devices with bit 1) during this CCA check period.

Following 808, the EWAP process may proceed to the next slot, or may conclude (e.g., with a transmission of an MPDU by the EWAP device with bit 1).

Figure 9:
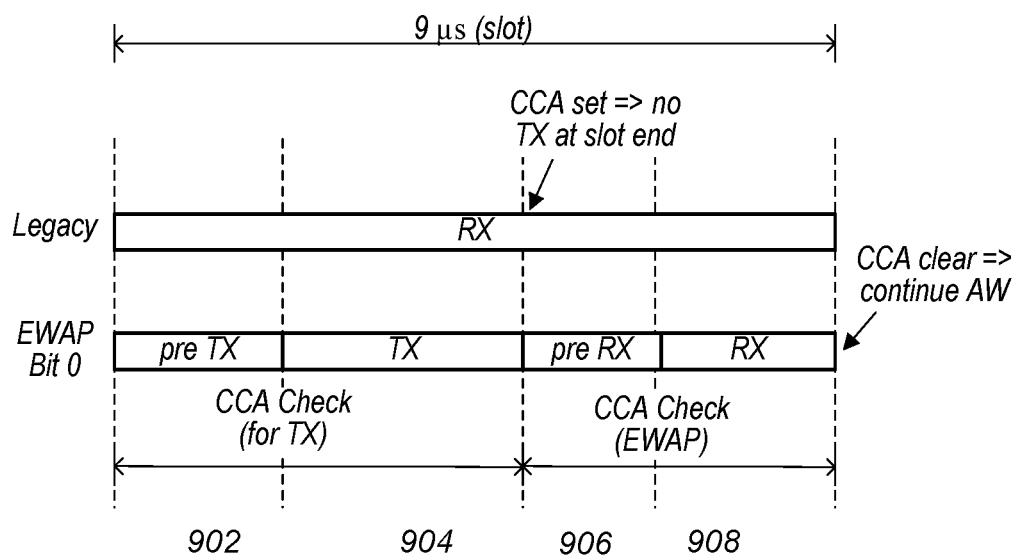

FIG. 9 is a similar timing diagram, depicting a legacy device and an EWAP device with bit 0, according to some embodiments.

During 902, the EWAP device may perform pre-transmission functions. During 904, it may transmit. By the end of 904, the legacy device may determine that the CCA is set, and therefore may determine not to transmit in the next slot (e.g., or longer, e.g., it may reset its CW timer).

During 906, the EWAP device may perform pre-reception functions. During 908, it may perform reception, and it may not receive any transmissions on the channel. Therefore, at the end of 908, it may determine that the CCA is clear, and it may continue the AW in the next slot. For instance, it may advertise the next bit of its random number. If, alternatively, the bit in the current slot is the final bit of its random number (e.g., last bit in the AW), it may proceed to transmit a packet.

Figure 10:
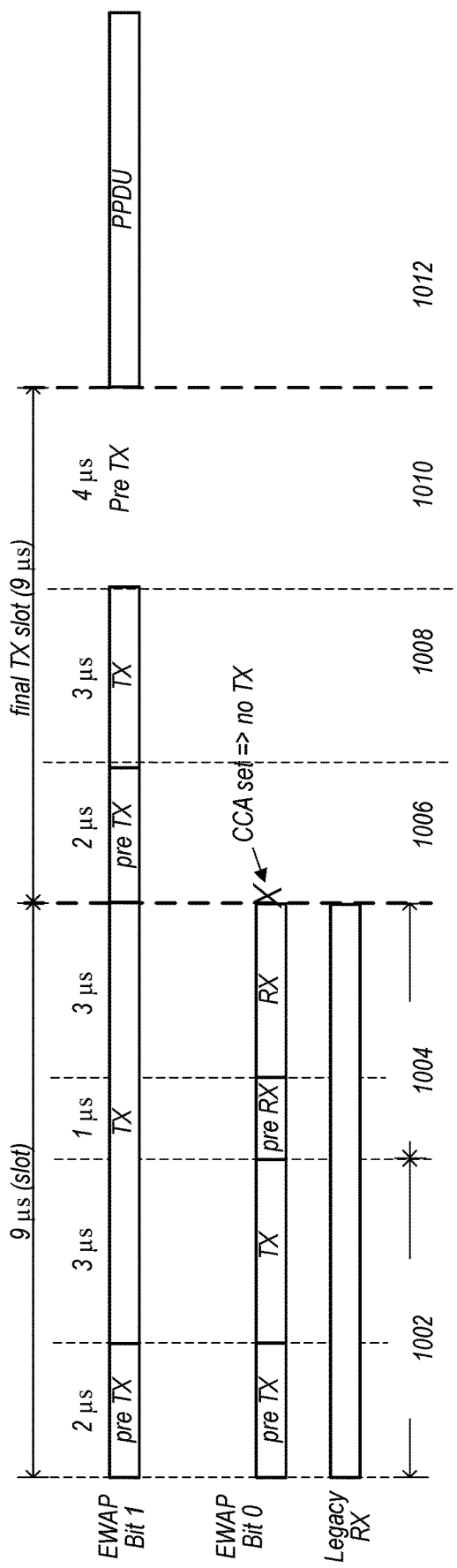

FIG. 10 illustrates the duration of the final two slots (e.g., two, 9 μs slots) at the end of an AW and the beginning of a subsequent packet transmission, according to some embodiments. The slots are shown for three devices, similar to FIG. 8: an EWAP capable device with a bit equal to 1 for the first slot, an EWAP capable device with a bit equal to 0 for the first slot, and a legacy device (e.g., non-EWAP capable). The first illustrated slot may be the final slot for advertising a digit of the random number. The second illustrated slot may be a pre-transmission slot (e.g., as denoted by "T" in FIG. 7 and described above). The second slot may be considered the final slot in the AW, even though no bit may be advertised during this slot.

During 1002, the EWAP devices may perform a CCA check for transmission as described above, e.g., may perform pre TX followed by transmission. The legacy device may not transmit and may receive, according to some embodiments.

During 1004, the EWAP device with bit 1 may transmit the bit value. The EWAP device with bit 0 may perform pre-reception and reception functions. It may detect the transmission of the 1-bit value from the EWAP device with bit 1, and therefore may determine that it is not selected for transmission following the AW. Further, it may determine not to transmit for the remainder of the illustration (e.g., it may restart the contention process). The legacy device may continue to receive. At the end of 1004, the first illustrated slot may end, and the final slot of the AW (e.g., the second illustrated slot) may begin.

During 1006, the EWAP device with bit 1 may perform pre-transmission functions, according to some embodiments. The other devices may continue to receive.

During 1008, the EWAP device with bit 1 may transmit. Such a transmission may cause other devices to determine that the channel is not idle, and may therefore reduce the likelihood of collision, according to some embodiments. The other devices may continue to receive.

During 1010, the EWAP device with bit 1 may perform pre-transmission functions, according to some embodiments. The other devices may continue to receive. The second illustrated slot (e.g., the final slot of the AW), may conclude.

During 1012, the next frame may begin. The EWAP device with bit 1 may transmit a packet (e.g., a frame). The frame may be a physical layer protocol data unit (PPDU), according to some embodiments. It may include a header and a data unit, e.g., as shown in FIG. 7. The other devices may continue to receive. Following the transmission of the packet, one or more other devices (e.g., the other illustrated devices and/or additional devices) may begin the process of contending for transmission resources again, e.g., by monitoring for the channel to be clear for at least a DIFS period.

Figure 11:
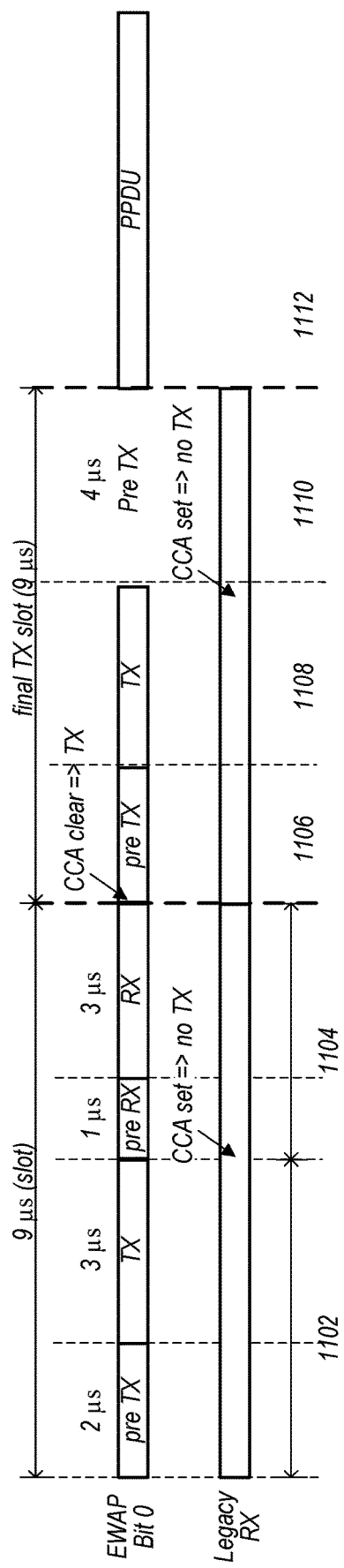

FIG. 11 illustrates the duration of the final two slots (e.g., two, 9 μs slots) at the end of an AW and the beginning of a subsequent packet transmission, according to some embodiments. The slots are shown for two devices, similar to FIG. 9: an EWAP capable device with a bit equal to 0 for the first illustrated slot and a legacy device (e.g., non-EWAP capable). The first illustrated slot may be the final slot for advertising a digit of the random number. The second illustrated slot may be a pre-transmission slot and may be the final slot in the AW.

The first slot may proceed similarly to FIG. 9. During 1102, the EWAP device may perform pre-transmission and transmission, and such transmission may discourage other devices from attempting to access the channel in the subsequent periods. For instance, the legacy device may detect this transmission, determine that the CCA is set (e.g., that the channel is not clear), and reset its CW timer, according to some embodiments.

During 1104, the EWAP device may perform pre-reception and reception. During the reception period, the EWAP device may determine that no other transmissions are detected on the channel (e.g., CCA may be clear). Accordingly, the EWAP device may determine that no other device has a higher random number (e.g., no other random number is associated with more priority for transmission). In other words, notwithstanding a zero in the last digit, the EWAP device may have the highest number, and thus may be selected by the EWAP contention process to transmit its packet following the AW.

At the beginning of the next slot (e.g., the final slot in the AW), the EWAP device may, in 1106, perform pre-transmission functions. Such pre-transmission may last for 2 μs, according to some embodiments. During 1108, the EWAP device may transmit for 3 μs, according to some embodiments. Accordingly, the legacy device may detect this transmission and may again determine that the CCA is not clear.

During 1110, the EWAP device may perform pre-transmission functions. In particular, according to some embodiments, the device may prepare a packet for transmission. The second illustrated slot (e.g., the final slot of the AW) may conclude.

During 1112, the EWAP device may transmit a packet, e.g., a PPDU. Following the PPDU transmission, other devices may detect that the channel is idle and may therefore begin contending for transmission resources, according to some embodiments.

Figure 12:
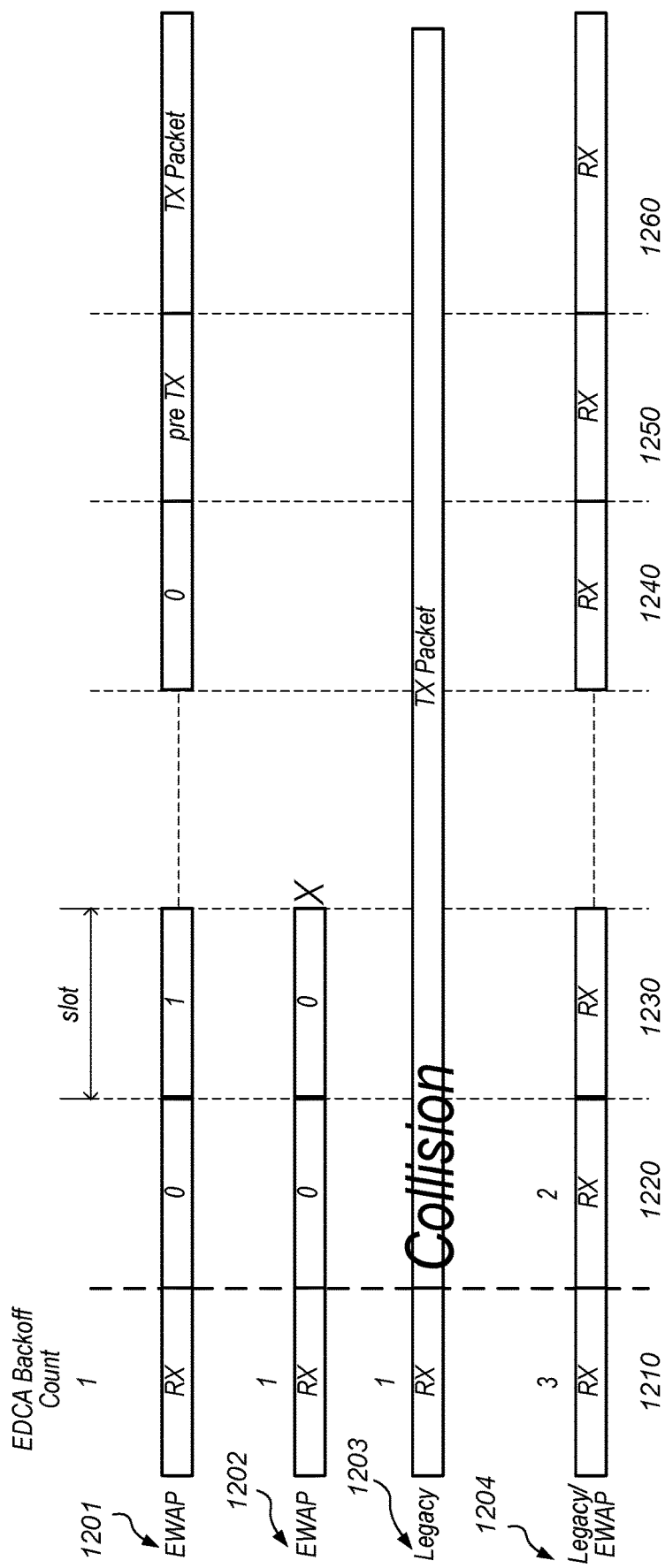
FIG. 12 illustrates an example of the timing of a potential collision between transmissions, according to some embodiments.

FIG. 12—EDCA and EWAP Slot Counting Summary

FIG. 12 is a timing diagram illustrating a possible collision between an EWAP device and a legacy device in the case that their CW timers expire at the same time, according to some embodiments.

Devices 1201 and 1202 may be EWAP capable devices. Device 1203 may be a legacy device. Device 1204 may be an EWAP capable device or may be a legacy device. This combination of devices is illustrative only, and the techniques of this disclosure may be applied to other combinations, as desired. Further, the random elements illustrated are exemplary only, and other values and outcomes are possible according to various embodiments.

During slot 1210, all of the devices may be in the EDCA backoff period. Devices 1201, 1202, and 1203 may be in the last slot of the backoff period (e.g. EDCA Backoff Count equal to 1). Device 1204 may have two slots remaining in the backoff period (e.g., EDCA Backoff Count equal to 3). Accordingly, each of the devices may receive during this slot, and no transmissions may be detected.

During slot 1220, the backoff period for devices 1201, 1202, and 1203 may expire. The (EWAP capable) devices 1201 and 1202 may begin the EWAP process and both devices may have a 0 to advertise in this slot. Accordingly, during this slot the devices may perform a series of functions (e.g., similar to that shown in and described with respect to FIGS. 8 and 9), according to some embodiments. The series of functions may include transmission and/or reception. The (legacy) device 1203, however, may begin transmitting a packet (e.g., an MPDU) from the beginning of this slot. This transmission may collide with the transmissions of devices 1201 and/or 1202. Device 1203, however, may not detect a collision. Device 1204 may detect the transmissions of one or more of the other devices and may determine that the channel is not idle. Accordingly, device 1204 may reset its CW timer and may begin waiting for the channel to be idle.

According to some embodiments (e.g., as illustrated), devices 1201 and/or 1202 may detect the transmission of device 1203 during this time, but may not stop the EWAP process. In at least some instances, this may be because devices 1201 and/or 1202 do not recognize the transmission of device 1203 as being a 1 transmitted by an EWAP device. According to other embodiments, device 1201 and 1202 may detect the transmission of device 1203, and may restart the EWAP process, e.g., to avoid a collision with the transmission of device 1203.

During slot 1230, device 1201 may sequentially advertise a 1 and device 1202 may advertise a zero. Accordingly, these devices may perform functions during the slot as shown in FIGS. 8 and 9, according to some embodiments. Device 1202 may detect the 1 advertised by device 1201, and may determine that it is not selected to transmit following the AW. Accordingly, device 1202 may reset its timers and begin waiting to restart the EDCA/EWAP process when the channel is idle (e.g., CCA clear). Device 1203 may continue transmitting its packet and device 1204 may continue waiting for the CCA to clear.

Prior to and during slot 1240, device 1201 may continue to sequentially advertise the bits of its random number. As shown, the last bit (e.g., the bit to be advertised in slot 1240) may be a 0. Devices 1202 and 1204 may continue to receive and wait for CCA clear. Device 1203 may continue transmitting.

During slot 1250, device 1201 may prepare to transmit its packet (e.g., as shown in and described with respect to FIGS. 10 and 11), according to some embodiments. Devices 1202 and 1204 may continue to receive and wait for CCA clear. Device 1203 may continue transmitting.

During slot 1260, device 1201 may begin to transmit its packet. This packet may collide with the ongoing transmission of device 1203. Devices 1202 and 1204 may continue to receive and wait for CCA clear.

Note that in the absence of device 1203, no collision may occur in the sequence illustrated by this figure. Such a collision may be possible in the specific case illustrated, e.g., in the case that the EDCA backoff timer of at least one legacy device expires at the same time as at least one other device, whether legacy or EWAP. However, in the absence of a legacy device's CW timer expiring at the same time as the CW timer of another device, such collisions may be avoided. For instance, even if device 1204 is a legacy device, it may detect the transmissions of the EWAP devices 1201 and 1202 during slot 1220, and may accordingly avoid transmitting during the illustrated time period.

FIGS. 13 and 14—Performance Comparison of EDCA vs. EWAP

FIGS. 13 and 14 may illustrate performance comparisons of networks with different numbers of devices under EWAP techniques vs. EDCA techniques. FIG. 13 illustrates a case of 20 devices (e.g., 20 dev.), and FIG. 14 illustrates a case of 10 devices (10 dev.). The first column of each table shows results for EWAP using a 6 bit (e.g., 6 b) random number for the AW period (e.g., N=6 bits, similar to shown in FIG. 7). The remaining columns illustrate the results of EDCA with different CW timer settings (e.g., ranging from CW=15 slots to CW=1023 slots). As shown, the packet latency and collision ratio of the EWAP systems may be lower than the EDCDA systems, and the net throughput (Net TP) may be higher.

Further Exemplary Embodiments

In the following, further exemplary embodiments are described.

One set of embodiments may include a method for accessing a wireless network by a first wireless device, the method comprising: generating a random number comprising N bits; sequentially advertising one or more bits of the random number onto the wireless network over N successive time slots, wherein the sequentially advertising comprises: if the bit has a value of 1 in a respective time slot, transmitting a 1 and advancing to the next bit in the random number, and if the bit has a value of 0 in the respective time slot, determining if another device transmits a 1 during the respective time slot, wherein if another device transmits a 1 during the respective time slot, halting the sequentially advertising and wherein if no other device transmits a 1 during the respective time slot, advancing to the next bit in the random number; and after sequentially advertising the Nth bit, transmitting a packet to the wireless network.

According to some embodiments, the wireless network may comprise an 802.11 network.

According to some embodiments, the method may further comprise: completing a legacy channel access process prior to sequentially advertising one or more bits of the random number.

According to some embodiments, halting sequentially advertising may further comprise restarting the method if the bit has a value of 0 and another device transmits a 1 during the respective time slot.

Another exemplary embodiment may include a wireless device, comprising: a radio and a processing element, wherein the radio and the processing element are configured to communicate with a wireless network, said communication comprising: randomly select a number comprising a first sequence of bits and a second sequence of bits; wait a duration, wherein the duration is based on the first sequence of bits. For each of the second sequence of bits: when the bit is equal to a first value, transmit the bit and move to the next bit; and when the bit is not equal to the first value, determine if another device on the wireless network transmits a bit equal to the first value, and: when at least one other device does transmit a bit equal to the first value, restart the communication by randomly selecting a new number; and when no other device does transmit a bit equal to the first value, transmit at least one packet on the wireless network.

Another exemplary embodiment may include a method for contending for access to a wireless network by a first wireless device, the method comprising: generating a random number comprising N bits; sequentially transmitting each bit of the random number onto the wireless network over N successive time slots, wherein the sequentially transmitting determines if the wireless device has the largest random number relative to other wireless devices contending for access to the wireless network; and halting the sequentially transmitting in response to determining that the random number of the wireless device is smaller than a random number of another wireless device also contending for access to the wireless network; gaining access to the wireless network in response to determining that the random number of the wireless device is larger than the random numbers of the other wireless devices also contending for access to the wireless network.

Another exemplary embodiment may include a wireless device, comprising: an antenna; a radio coupled to the antenna; and a processing element operably coupled to the radio, wherein the device is configured to implement any or all parts of the preceding examples or detailed description.

A further exemplary set of embodiments may include a non-transitory computer accessible memory medium comprising program instructions which, when executed at a device, cause the device to implement any or all parts of any of the preceding examples or detailed description.

A still further exemplary set of embodiments may include a computer program comprising instructions for performing any or all parts of any of the preceding examples or detailed description.

Yet another exemplary set of embodiments may include an apparatus comprising means for performing any or all of the elements of any of the preceding examples or detailed description.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless device, comprising:
   a radio; and
   one or more processors;
   wherein the radio and the one or more processors are configured to contend for access to a medium, the contention comprising:
   selecting a random number comprising N bits;
   sequentially, for each bit of at least a subset of the N bits:
      transmitting, when the bit is equal to a first value, the bit on the medium and transitioning to a next bit; and
      determining, when the bit is not equal to the first value, if another device transmits a bit on the medium, and:
         when at least one other device transmits a bit, restarting the contention; and
         when no other device transmits a bit, transitioning to the next bit; and
   transmitting at least one packet on the medium.

2. The wireless device of claim 1, wherein determining if another device transmits the bit on the medium comprises transmitting on the medium during a first slot partition.

3. The wireless device of claim 1, wherein determining if another device transmits the bit on the medium comprises monitoring for a transmission of another device on the medium during a second slot partition.

4. The wireless device of claim 1, wherein the first value is 1.

5. The wireless device of claim 1, wherein the medium is associated with an IEEE 802.11 network.

6. The wireless device of claim 1, wherein restarting contention comprises performing a clear channel assessment.

7. A method for contending for access to a wireless network by a wireless device, the method comprising:
   generating a random number comprising N bits;
   sequentially transmitting respective bits of the random number onto a channel of the wireless network over respective time slots associated with the respective bits of the random number;
   comparing the random number to a random number of any other wireless device contending for access to the wireless network, wherein said comparing comprises:
      determining whether any other device sequentially transmits a bit on the channel during a respective time slot when the respective bit of the random number does not meet a condition; and
      based on determining that at least one other device sequentially transmits the bit on the channel during the respective time slot when the respective bit of the random number does not meet the condition:
         halting sequentially transmitting bits; and
         restarting said contending for access to the wireless network; and
   based on the comparison, determining whether to gain access to the wireless network.

8. The method of claim 7, said comparing further comprising:
   based on determining that no other device sequentially transmits the bit on the channel during any respective time slot when the respective bit of the random number does not meet the condition, determining to gain access to the wireless network.

9. The method of claim 7, wherein said sequentially transmitting a respective bit comprises:
   transmitting during a first partition of the respective time slot.

10. The method of claim 9, wherein said sequentially transmitting the respective bit further comprises, during a second partition of the respective time slot:
    transmitting, if the respective bit meets the condition; and
    receiving, if the respective bit does not meet the condition.

11. The method of claim 7, further comprising determining that the channel has been idle for at least a distributed coordination function (DCF) Interframe Space (DIFS) duration.

12. The method of claim 7, wherein determining to gain access to the wireless network comprises transmitting at least one packet on the channel.

13. An apparatus, comprising:
    one or more processors, wherein the one or more processors are configured to cause a wireless device to:
       select a first random number associated with a contention process for a wireless network;
       sequentially advertise bits of the first random number during a series of respective slots associated with respective bits of the first random number, wherein said sequentially advertising a respective bit of the first random number comprises:
          transmitting during at least a portion of a respective slot associated with the respective bit of the first random number, wherein said transmitting is based on a value of the respective bit of the first random number being equal to a first value and without transmitting when the value of the respective bit is not equal to the first value;

determining to proceed to a next respective bit of the first random number based at least in part on the value of the respective bit of the first random number being equal to the first value; and after sequentially advertising a last bit of the first random number:

determine that no other wireless device had a higher random number associated with the contention process; and access the wireless network in response to the determination that no other wireless device had a higher random number associated with the contention process.

14. The apparatus of claim 13, wherein the respective slot comprises a first partition and a second partition, wherein the first value is 1, wherein sequentially advertising the respective bit of the first random number comprises:

during the respective slot:

when the respective bit of the first random number is 0:
transmit for the first partition, and
receive for the second partition; and when the respective bit of the first random number is 1:
transmit for both the first partition and the second partition.

15. The apparatus of claim 14, wherein determining whether to proceed to the next respective bit of the first random number comprises:

when the bit of the first random number is 1 or when the bit is 0 and no transmission is received during the second partition, determine to proceed to the next bit of the first random number; and when the bit of the first random number is 0 and when a transmission is received during the second partition, determine not to proceed to the next bit of the first random number.

16. The apparatus of claim 13, wherein determining whether to proceed to the next respective bit of the first random number is further based at least in part on whether any other wireless device sequentially advertises a bit.

17. The apparatus of claim 13, wherein accessing the wireless network comprises transmitting at least one packet on the wireless network.

18. The apparatus of claim 13, wherein the one or more processors are further configured to cause the wireless device to perform a legacy process.

19. The apparatus of claim 18,
wherein the wireless network is an IEEE 802.11 network; and
wherein the legacy process comprises enhanced distributed channel access (EDCA).

20. The apparatus of claim 13, wherein the one or more processors are further configured to cause the wireless device to determine that a clear channel assessment (CCA) prior to sequentially advertising bits of the first random number.

* * * * *